G. W. THATCHER.
Chimney Cowl.

No. 15,536.

Patented Aug. 12, 1856.

Inventor.
George W. Thatcher

UNITED STATES PATENT OFFICE.

GEORGE W. THATCHER, OF PHILADELPHIA, PENNSYLVANIA.

CHIMNEY-COWL.

Specification of Letters Patent No. 15,536, dated August 12, 1856.

*To all whom it may concern:*

Be it known that I, GEORGE W. THATCHER, of the city and county of Philadelphia and State of Pennsylvania, have invented a new and useful improvement in ventilators for the more complete ventilation of school-houses, churches, theaters, hospitals, dwellings, railroad-cars, and water-craft and for curing smoky chimneys; and I do hereby declare that the following is a full, clear, and exact description of the construction and operation of the same, reference being had to the accompanying drawings.

Figure 1:
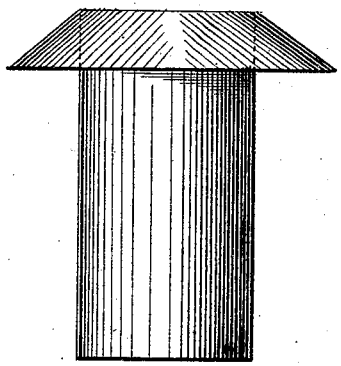
Figure 2:
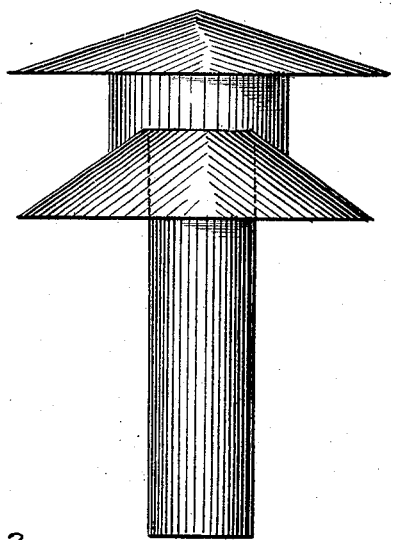
Figure 3:
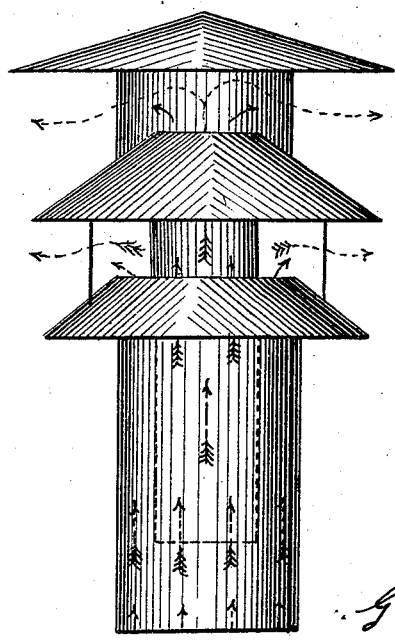

The nature of my invention and improvement consists in the formation of a double acting ventilator, by means of a central radiating tube as follows:

Figure 1 is a drawing of the outer or exterior tube with its cap or frustum. Fig. 2, is a drawing of the inner or central tube with its cap or frustum, and cover. Fig. 3, is a drawing of the combination of the outer or exterior tube in conjunction with the inner or central tube forming together an improved double acting ventilator.

The advantages claimed in this arrangement over all others are, firstly, the introduction of the inner tube extending down into the flue by which an accelerated draft is obtained through the central tube it becoming heated by the escape of the surrounding gas and the products of combustion; secondly, protection from outer currents or drafts of air without checking the natural draft of the chimney.

What I claim as my invention, is—

The introduction of one or more central tubes, with their caps or frustums, inclosed within an outer tube with its cap or frustum, and extending downward within the outer tube so as to increase the upward draft, and afford protection from winds and storms.

GEORGE W. THATCHER.

Witnesses:
JOHN H. CAHILL,
J. D. ANDERSON.